United States Patent [19]

Vaillant de Guelis et al.

[11] Patent Number: 5,115,158
[45] Date of Patent: May 19, 1992

[54] ELECTRIC MOTOR WITH MAGNETIC LOCKING ABUTMENT MEMBER AND HEAT SHIELD FOR A SPACE VEHICLE OPERATED BY A MOTOR OF THIS KIND

[75] Inventors: Hubert Vaillant de Guelis, Aubergenville; Jean-Louis Joly, Bazemont, both of France

[73] Assignee: Aerospatiale Societe Nationale Industrielle, Paris, France

[21] Appl. No.: 415,353

[22] PCT Filed: Dec. 22, 1988

[86] PCT No.: PCT/FR88/00635
§ 371 Date: Aug. 23, 1989
§ 102(e) Date: Aug. 23, 1989

[87] PCT Pub. No.: WO89/06063
PCT Pub. Date: Jun. 29, 1989

[30] Foreign Application Priority Data
Dec. 23, 1987 [FR] France .................. 87 18074

[51] Int. Cl.⁵ ............................................. H02K 33/00
[52] U.S. Cl. ..................................................... 310/15
[58] Field of Search .................... 310/15, 36, 46, 47, 310/37, 38, 39, 56, 77, 28; 251/129.11

[56] References Cited

U.S. PATENT DOCUMENTS

| | | | |
|---|---|---|---|
| 3,634,857 | 1/1972 | Pihl | 340/815.26 |
| 3,970,980 | 6/1976 | Nelson | 310/39 |
| 4,059,775 | 11/1977 | Warmka | 310/12 |
| 4,227,164 | 10/1980 | Kitahara | 310/36 |
| 4,577,832 | 3/1986 | Sogabe | 251/129.11 |
| 4,642,539 | 2/1987 | Hinds | 310/68 R |

FOREIGN PATENT DOCUMENTS

| | | | |
|---|---|---|---|
| 1331066 | 5/1963 | France | 310/46 |
| 2058477 | 5/1971 | France . | |

*Primary Examiner*—Steven L. Stephan
*Assistant Examiner*—Ed To
*Attorney, Agent, or Firm*—Browdy and Neiman

[57] ABSTRACT

An electric motor comprises a stator element made of magnetic material, a moving element made of magnetic material and carrying at least one permanent magnet and adapted to run along sections of the stator element while defining two constant air-gaps by means of which the magnetic flux of the permanent magnet closes up in said stator element, and at least one coil wound around at least one of said sections. At least a pair of stops delimits a given clearance for the moving element along the coil. The movable element bears against either of the stops as a function of the direction of the direct current applied to the coil and remains magnetically locked thereto by means of a magnetic portion of the stops through which passes part of the magnet flux.

17 Claims, 4 Drawing Sheets

ELECTRIC MOTOR WITH MAGNETIC LOCKING ABUTMENT MEMBER AND HEAT SHIELD FOR A SPACE VEHICLE OPERATED BY A MOTOR OF THIS KIND

As known an orbiting artificial satellite is exposed to temperatures between approximately +150° C. and −180° C. according to whether it is in sunlight or shadow. This explains the need to provide thermal protection for onboard equipment that cannot withstand such temperature differences.

Such thermal protection can be provided in various ways, and mention may be made of two types of system:
so-called passive systems using paint or insulators and implementing a super-insulator;
so-called active systems in which heat is exchanged by means of a fluid flowing through heat exchangers.

Associated with these heat exchangers are heat shields which cover or uncover the heat exchangers to modulate radiation from them to the exterior of the satellite.

A Maltese cross shaped heat shield may be used and rotated from 0° to 45° and from 45° to 0° relative to a fixed reference to cover or uncover heat exchangers and so modulate their radiation.

Previously the heat shield was rotated by a spiral-shape bimetallic strip, peripheral abutment members immobilising the shield in the open or closed position.

This solution has the undoubted advantage of being simple and of not consuming any energy, but its major disadvantage is that it does not provide for precise (if any) regulation because the bearings used for the rotation movement often have hard spots, especially after having been subjected to the vibrations of launching the vector placing the satellite in orbit.

Given these shortcomings, a new device based on "all or nothing" rotation by means of a brushless torque motor has been developed.

The problem was to find a system to damp the impacts at the end of opening or closing movements and to guarantee the open or closed position without consuming energy.

In accordance with the invention damping of the movements is provided by elastic abutment members made from an amagnetic material, the motor torque being maintained until the motor stops completely, whereas the locking without expenditure of energy is obtained by shunting part of the magnetic field of the rotor to a magnetic tooth judiciously disposed on the stator.

The advantage of a system of this kind is that the farther the rotor moves away from the tooth the smaller is the locking force, reducing very quickly to zero since the change in the force is inversely proportional to the square of the airgap.

In other words, the present invention therefore concerns a magnetic locking abutment member device which associated with a torque motor enables optimum operation of a heat shield.

More generally, the present invention concerns an electric motor comprising magnetic locking abutment members yielding highly accurate abutment positioning and maintaining this position without expenditure of energy.

This is why the magnetic locking abutment member device in accordance with the invention is applicable in a particularly advantageous way to brushless direct current torque motors.

In this application the motor is of a type comprising: a magnetic material stator member surrounded over part of its length by at least one winding and a mobile member carrying at least one permanent magnet generating a magnetic flux which is closed in said stator member.

The invention therefore proposes an electric motor comprising:
a magnetic material stator member,
a magnetic material mobile member carrying at least one permanent magnet and having two ends adapted to lie along sections of the stator member to define with these sections two constant airgaps by virtue of which the magnetic flux of the permanent magnet is closed within said stator member between these sections,
at least one winding wound around at least one of these sections,
at least one pair of abutment members delimiting along said sections of the stator member a particular range of movement for said ends of the mobile member between two abutment configurations, one of these ends facing said winding for any position of the mobile member, each of the abutment members being provided with a magnetic material portion linked to the stator member and defining, when one of the ends is in contact with the abutment member, an airgap (E) through which some of the magnetic flux from the magnet passes into said magnetic material portion, the mobile member coming into one or the other of said abutment configurations according to the direction of the direct current applied to the winding and remaining magnetically locked there by virtue of said magnetic portion of the abutment members.

It will be understood that by virtue of the magnetic decoupling of the windings and the abutment members and therefore by virtue of the "passive" locking in abutment that it teaches, enabling good control of the kinetics of the mobile member, the invention is distinguished from known devices, particularly those known from the documents EP-A-0 188 921, U.S. Pat. No. 4,577,832, U.S. Pat. No. 3,634,857 and FR-A-2 058 477 in which the movement of the mobile member results exclusively from the attraction-repulsion generated because of the windings by the abutment members, which inevitably produces impacts at the end of travel ("active" magnetic locking in abutment).

In preferred embodiments, which may optionally be combined with each other:
the abutment members are made from an non-magnetic elastic material and each is separate from the magnetic portion disposed between the abutment member and the mobile member,
said pair of abutment members is carried by a common abutment member body, the abutment configurations corresponding either to the contact of one of the ends with one of the abutment members or to the contact of the other end with the other abutment member,
said pair of abutment members is carried by two separate abutment member bodies and surround with said range of movement one of these ends of the mobile member, each of the ends of the mobile member is formed by a permanent magnet and a winding is wound onto each of the two elongated sections.

The invention also proposes a heat shield for space vehicles operated by a motor of this kind.

Other characteristics, advantages and peculiarities of the invention will emerge from the description given hereinafter with reference to the appended drawings which show schematically and by way of example only two preferred embodiments of the invention.

Referring to FIGS. 1 through 5, in this embodiment of the invention the magnetic locking abutment member device is entirely integrated into the motor proper and there is consequently no increase in overall size due to the abutment members or locking members.

Generally speaking, the system comprises a stator 1, a rotor 2 and a duplicated system of magnetic locking abutment members 3A-3B.

More specifically, the stator comprises two diametrally opposed windings 4A-4B mounted on a magnetic ring 5 to which they are secured by means of end rings 6A-6B. Between the windings 4A-4B are diametrally opposed magnetic locking plates 7A-7B fastened to the respective abutment members 3A-3B.

Figure 5:
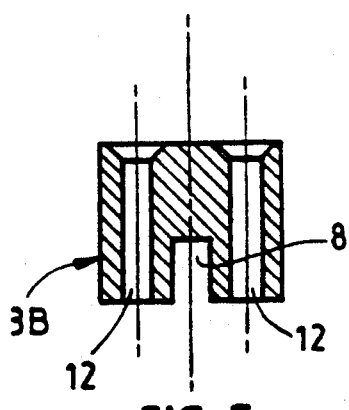
FIGS. 4 and 5 are transverse cross-sections of it on the respective lines IV—IV and V—V in FIG. 3.
Figure 4:
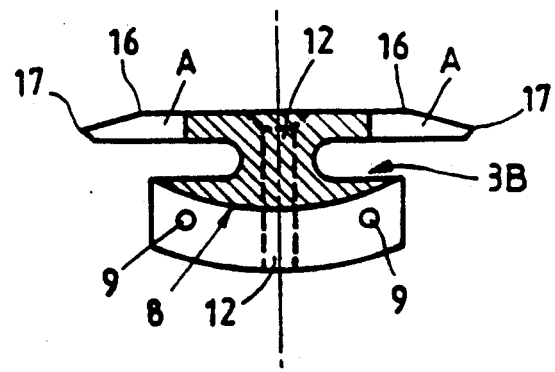
Figure 3:
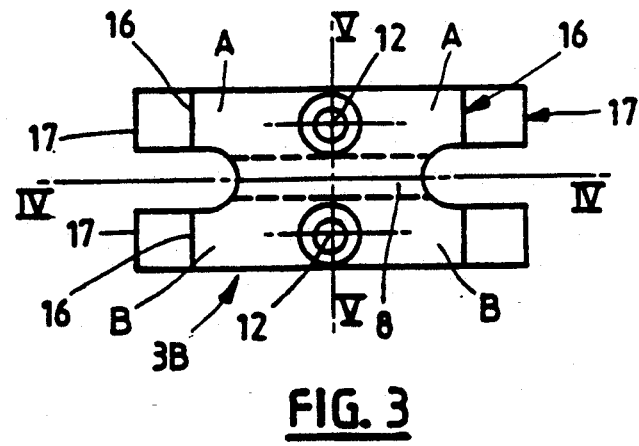
FIG. 3 is a detail plan view showing one of the abutment members of the system from FIG. 1.

To this end each of the abutment members, for example the abutment member 3B shown in FIGS. 3, 4 and 5, comprises a curved longitudinal slit 8 adapted to accommodate the corresponding magnetic plate 7A-7B secured by means of pegs 9.

The part of the abutment member body facing towards the interior of the stator is divided into two parallel beams A and B allowing the locking magnetic flux to pass, as will be explained in more detail later.

The two systems of abutment members 3A-3B and locking plates 7A-7B are each mounted on the ring 5 of the stator by means of bolts 10A-10B and nuts 11A-11B, said abutment members comprising appropriate holes 12.

The rotor 2 comprises two magnets 13A-13B magnetised in the same direction F and juxtaposed to a magnetic material hub 14 which may optionally be hollowed out at its centre. To the lateral surfaces of the rotor are adhesively bonded plates 15, optionally of magnetic material, the function of which is to protect the magnets from impacts when abutting contact occurs.

Note that the abutment members 3A-3B are made from an elastic material such as "DELRIN" and the ends of the lateral beams A and B are cut at an angle $\beta$ (see FIG. 1) so that when the abutment members flex only the tops 16 thereof are worn down without affecting the ends 17, so that correct positioning on the abutment members is ensured.

It is seen immediately that the advantage of making the abutment members 3A-3B from a non-magnetic material lies in the fact that should an abutment member break it will not be attracted by the magnets 13A-13B and consequently will not cause any disruption of operation.

From the point of view of operation it is seen immediately that the magnets 13A-13B generate a magnetic flux which is closed to either side of the rotor in the ring 5. Between the magnets and the ring is an airgap in which the magnetic field is substantially homogeneous.

As previously mentioned, facing the magnets 13A-13B are windings 4A-4B which are connected in series and which, when a current passes through them, produce a torque on the rotor 2 according to Laplace's law. Acted on by this torque, the rotor 2 turns about the centre 0 through an angle $\alpha$ which corresponds to the travel between the abutment members 3A-3B. It is seen that when it rotates the rotor 2 leaves one of the abutment members to go to the other abutment member, at each of its ends, the current being maintained in the windings 4A-4B until the rotor is stabilised against the abutment members at the end of its travel.

The current in the windings 4A-4B may then be interrupted, the locking torque being then provided by the magnetic plates 7A-7B the effect of which is to deflect some of the magnetic flux via the airgaps E between the magnet 13A and the end of the magnetic plate 7A, on the one hand, and between the magnet 13B and the end of the magnetic plate 7B, on the other hand.

Changing the direction of the current in the windings 4A-4B changes the direction of rotation of the rotor 2 and after the latter stabilises at the end of its travel and the current in the windings is interrupted locking is achieved by deviation of some of the magnetic flux via the airgaps E between the magnet 13A and the end of the magnetic plate 7B, on the one hand, and between the magnet 13B and the end of the magnetic plate 7A, on the other hand. Note that as previously mentioned the passage of the locking magnetic flux into the airgaps E is favoured in that it occurs between the two parts A and B of the abutment members 3A-3B.

The control signal for the motor is reduced to a simple voltage/time or current/time pulse signal.

The result of the foregoing is that: the locking action does not consume any energy; the locking torque is adjustable by modifying the value of the airgaps E; the functioning of the abutment members and that of the locking system are not degraded by vacuum or temperature.

Moreover, the advantage of making the abutment members 3A-3B from non-magnetic material in the event of accidental breaking thereof has already been explained.

However, it is apparent that said abutment members could be made from a magnetic material, which would make it possible to eliminate the magnetic locking plates 7A-7B.

As mentioned in the preceding explanation of the genesis of the invention, the present invention concerns a magnetic locking abutment member device which, when associated with a torque motor, enables a heat shield to be operated under optimum conditions.

Figures 1, 2:
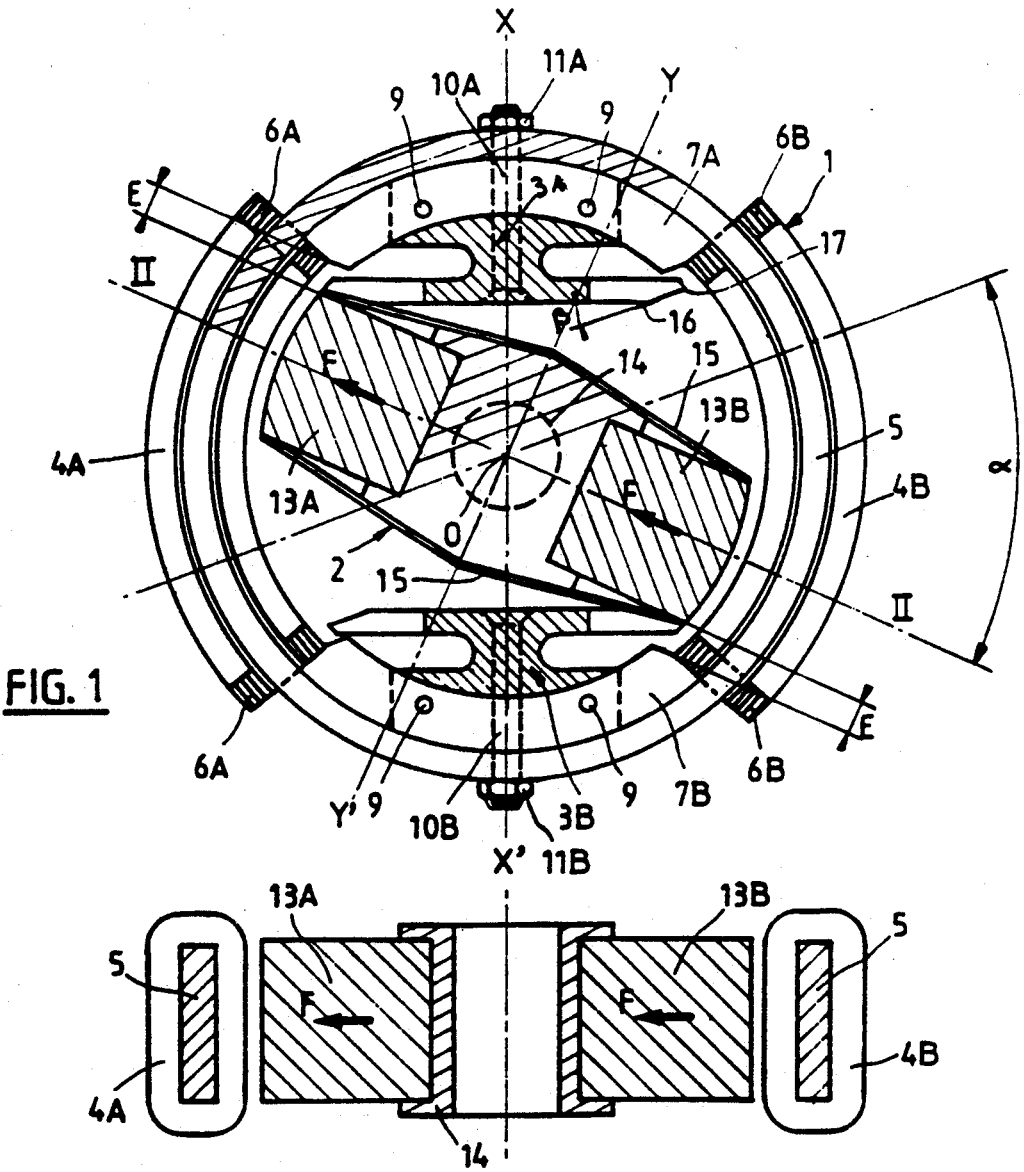
FIG. 1 is a partially cutaway plan view of a brushless direct current torque motor provided with a magnetic locking abutment member device in accordance with the invention.
FIG. 2 is a view of it in transverse cross-section on the line II—II in FIG. 1.
Figure 6:
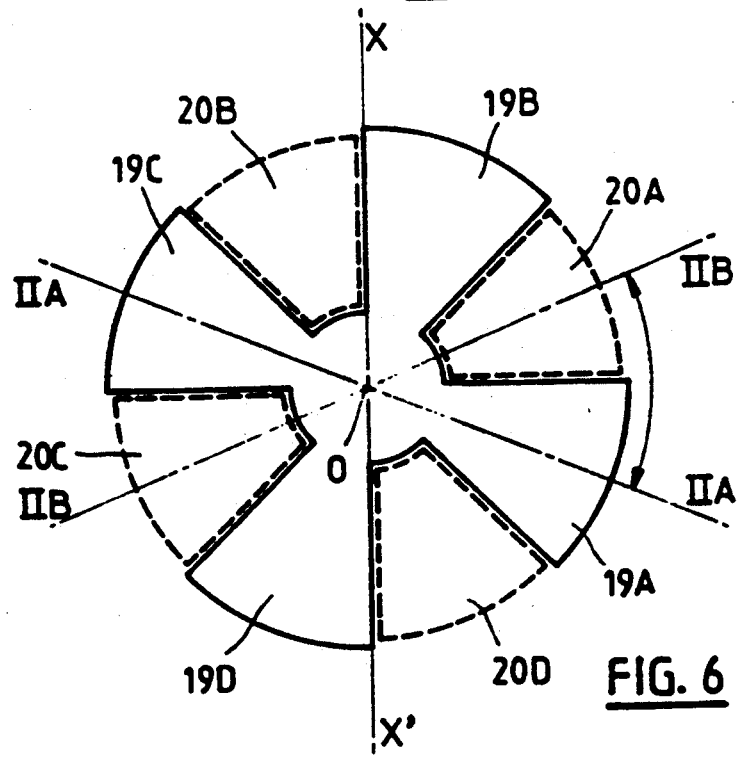
FIG. 6 is a diagram explaining how the invention is applied to controlling a heat shield.

Referring to FIG. 6 showing a Maltese cross shaped heat shield with four blades 19A, 19B, 19C, 19D between which are distributed four fixed heat exchangers 20A, 20B, 20C and 20D, and comparing FIG. 6 with FIG. 1 showing the brushless direct current torque motor fitted with a magnetic locking abutment member device in accordance with the invention, it is seen that it suffices to couple in rotation about the geometrical centre 0 the central part of the Maltese cross with the hub 14 of the rotor 2 of the motor, taking care to lock the longitudinal axis II—II of the rotor 2 to the longitudinal axis IIA—IIA of the opposed blades 19A-19C of the shield, to optimise the operating conditions of the shield.

It is seen immediately that rotation in one direction or the other of the rotor 2 of the motor results in rotation from 0° to 45° and from 45° to 0° of the shield to go from the initial position IIA—IIA to the final position IIB—IIB and vice-versa, which makes it possible to cover or uncover the fixed heat exchangers 20A, 20B, 20C and 20D and consequently to modulate their radiation to the exterior, under optimum conditions because the system further provides for damping impacts at the ends of opening and closing movements and maintains the open or closed position without consumption of energy.

In the system described with reference to FIGS. 1 through 5 the locking and abutment members system is redundant in order to obtain forces that are as symmetrical as possible, it being understood that the scope of the invention is not exceeded by implementing a non-symmetrical system.

In particular, one of the abutment members 3A-3B may be dispensed with or each of the abutment members may be reduced to its righthand or lefthand half relative to the axis XX' in FIG. 1, it being obvious that in this latter case the rotor 2 may be reduced to its righthand or lefthand half relative to the axis YY' in FIG. 1.

In the alternative embodiment of the invention shown in FIGS. 7 and 8 there is obtained a magnetic locking abutment member device analogous to that which has just been described with reference to FIGS. 1 through 5 but applied in this instance to a linear motor.

Figure 7:
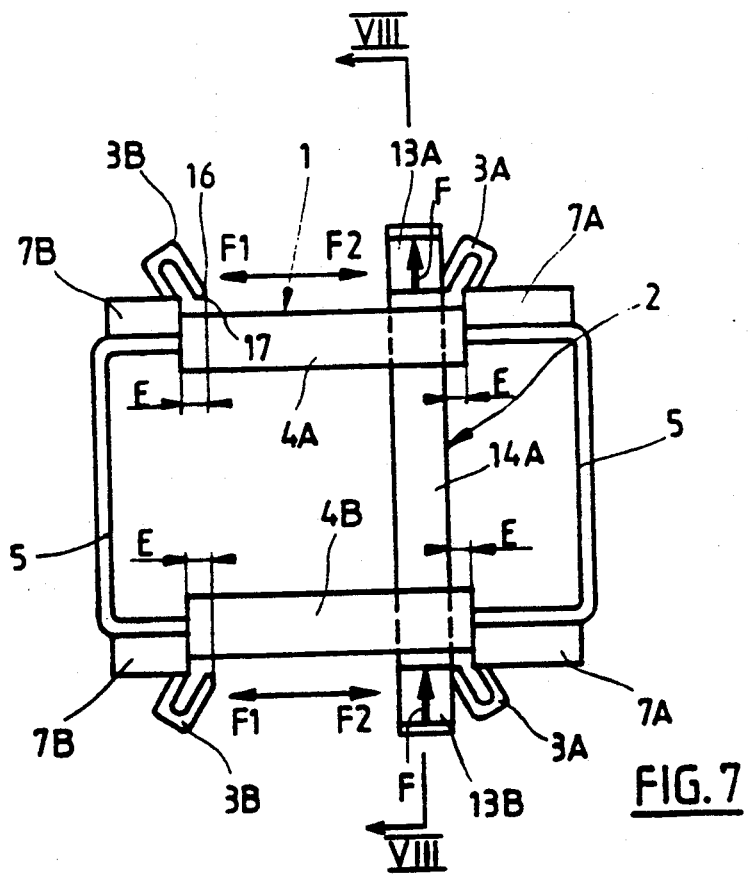
FIG. 7 is a diagram showing a variation on the FIG. 1 embodiment to a smaller scale.
Figure 8:
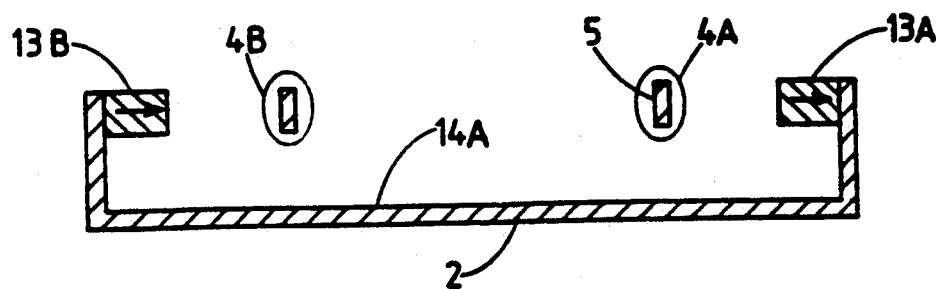
FIG. 8 is a view of this variation in cross-section on the line VIII—VIII.

It is immediately apparent that the system of FIGS. 7 and 8 is derived from the system of FIG. 1 by giving the radius of the stator from the first embodiment an infinite value in the second embodiment.

To avoid unnecessary overburdening of the description the set of component parts of the system will not be described again, the same reference numbers being carried over to FIGS. 7 and 8 to designate the same components. Note that the two magnets 13A and 13B of the rotor are joined not by a hub but by a magnetic material linking member 14A.

Operation is analogous in the case of the linear motor with the single exception that instead of rotating about the geometrical centre 0 of the system the magnets 13A and 13B move in translation in the direction of the arrow F1 or that of the arrow F2 when the windings 4A and 4B are energised and the current flows in one direction or the other. When the magnets 13A and 13B come into contact with the abutment members 3B and have stabilised it is sufficient to cut off the current in the windings 4A and 4B, the locking torque being provided by the magnetic plates 7B deflecting some of the magnetic flux via the airgap E.

Note that in this embodiment the magnets 13A and 13B are magnetised in a direction F with no preferred orientation relative to the plates 7A and 7B.

It is evident that the FIG. 1 and FIG. 7 configurations are not the only ones possible.

Figure 9:
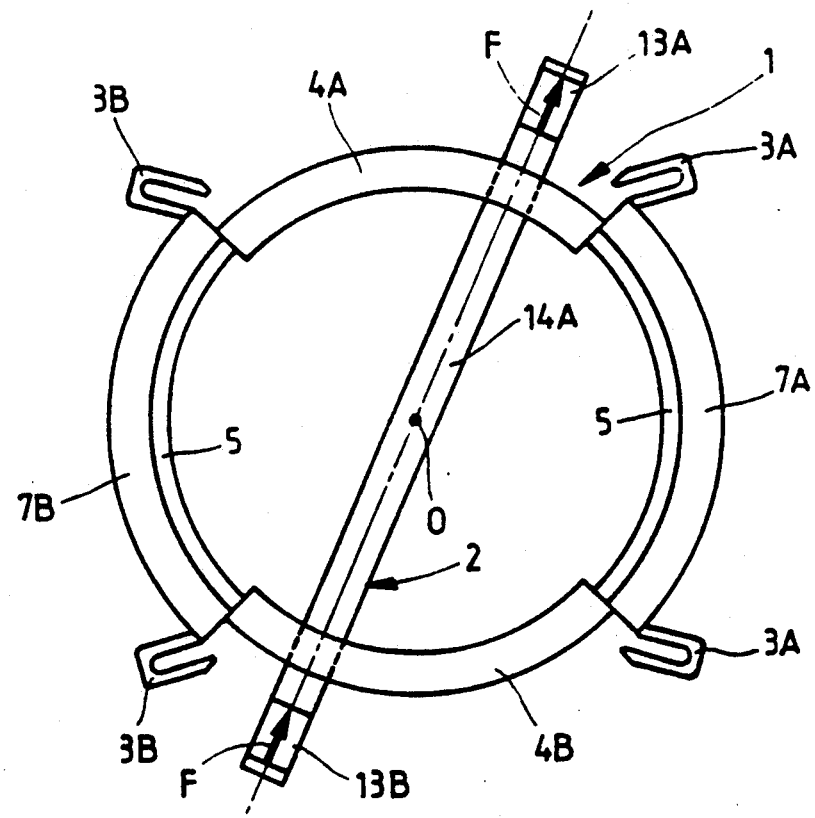
FIG. 9 is a schematic representation of another embodiment.

It can been seen that by placing the centre of the infinite radius in the plane containing the FIG. 7 at the geometrical centre 0 of the system and giving this radius a finite value, as in the case of FIG. 1, there is obtained a third configuration like that schematically represented in FIG. 9 where the abutment members 3A, 3B and the magnets 13A-13B are outside the ring 5, the windings 4A, 4B and the plates 7A-7B in the plane of FIG. 7.

Note that as in the previous cases the magnets 13A and 13B must be joined by a magnetic material linking member 14A which pivots about an axis passing through the geometrical centre 0 of the system.

In this configuration the magnetic locking abutment member device, the functioning of which is unchanged, is no longer totally integrated into the motor proper but is situated externally of the stator, which makes it possible to release the internal space of the stator.

It will be evident that in practice the configuration of the invention best suited to the specific problem in hand will be adopted.

In other words, the configuration of the magnetic locking abutment member device in accordance with the invention will be chosen that integrates best into the system requiring precise abutment positioning and maintaining in position without expenditure of energy.

It goes without saying that the foregoing description has been given by way of non-limiting example only and that numerous variations thereon may be proposed by those skilled in the art without departing from the scope of the invention.

We claim:

1. Electric motor comprising:
   a magnetic material stator member (5) comprising two elongate stator portions
   a magnetic material mobile member (2) carrying at least one permanent magnet (13A, 13B) and having two ends (13A, 13B) respectively adapted to move along said stator portions and to be spaced from said stator portions by two constant airgaps, the magnetic flux of the permanent magnet being closed through said airgaps,
   at least one winding (4A, 4B) wound around at least one of said stator portions,
   at least one pair of abutment members (3A-A, 3A-B, 3B-A, 3B-B) delimiting along said stator portions a particular range of movement for said ends of the mobile member between two abutment configurations, one of these ends facing said winding for any position of the mobile member between said abutment configurations, each of the abutment members being provided with a magnetic material portion (7A, 7B) linked to the stator member and defining, when one of the ends is in contact with said each of the abutment members, an airgap (E) through which a part of the magnetic flux from the magnet passes into said magnetic material portion, the mobile member coming into one or the other of said abutment configurations according to the direction of the direct current applied to the winding and remaining magnetically locked there by said magnetic portion of the abutment members.

2. Motor according to claim 1, wherein each of the abutment members further comprises an abutting portion made from an non-magnetic elastic material.

3. Motor according to claim 1 wherein said pair of abutment members (3A; 3B) is part of a same abutment member body, the abutment configurations corresponding respectively to bearing of one end against one of the abutment members or to bearing of the other end against the other of the abutment members.

4. Motor according to claim 1 wherein said pair of abutment members is carried by two separate abutment member bodies and surround with said range of movement one end of the mobile member.

5. Motor according to claim 1 wherein each end of the mobile member is formed by a permanent magnet and a winding is wound on to each of the two stator portions.

6. Motor according to claim 1, wherein the stator member (5) is a ring having an axis and carried by a stator (1) and the mobile member (2) is a rotor rotatable relative to the stator around said axis.

7. Rotor according to claim 6 wherein the stator (1) comprises two diametrically opposed windings (4A, 4B) energised in series between which are disposed two diametrally opposed magnetic locking plates (7A, 7B) fixed to two diametrally opposed and fixed double abutment members (3A, 3B) on the ring (5) of the stator (1) and the rotor (2) comprises two magnets (13A, 13B) magnetised in a same direction (F) and juxtaposed to a magnetic material hub (14).

8. Motor according to claim 7 wherein the lateral surfaces of the magnets (13A, 13B) are protected by protective plates (15).

9. Motor according to claim 6, wherein the part of the body of the abutment members (3A, 3B) facing towards the rotor is divided into two parallel beams transverse to said axis for the passage therebetween of the locking magnetic flux through the airgap (E) and the ends of which are cut at a predetermined angle ($\beta$) to ensure positioning of the rotor (2) on the abutment members.

10. Motor according to claim 6 wherein the abutment members (3A, 3B) and the magnets (13A, 13B) of the rotor (2) are disposed externally of the ring (5) and in the same plane of symmetry of the latter, the windings (4A, 4B) and the magnetic locking plates (7A, 7B), whereby it is possible to release the internal space of the stator.

11. Motor according to claim 1, wherein the stator portions are parallel and rectilinear and the abutment members (3A, 3B), the magnetic locking plates (7A, 7B) and the magnets (13A, 13B) of the mobile member (2) are disposed in a plane transverse to the magnetic stator member (5) and to the windings (4A, 4B) of the stator (1), the mobile member (2) moving in lateral translation (F1-F2) parallel to said stator portions.

12. Motor according to claim 1 wherein the abutment members are made from a magnetic material and thereby themselves constitute the magnetic portions into which passes said part of the magnetic flux from the magnet.

13. A motor according to claim 1 further comprising a heat shield for space vehicles provided with blades (19A, 19B, 19C, 19D) adapted to cover or uncover heat exchangers (20A, 20B, 20C, 20D), the shield being linked to the mobile member and the heat exchangers being fixed relative to the stator member.

14. An electric motor comprising:
a stator loop member made of a magnetic material and comprising two substantially elongate stator portions;
a movable member made of a magnetic material and including at least one permanent magnet, movable between two abutment configurations and substantially extending transversely to said elongate stator portions, and having two ends adapted respectively to move along said elongate stator portions when said movable member is moved between said abutment configuration, said two ends being spaced from said elongate stator portion by airgaps having a width which remains constant when said movable member is moved between said abutment configurations, said at least one permanent magnet generating a magnetic flux which is closed through said two ends, said airgaps and said stator loop member;
at least one winding wound around at least one of said elongate stator portions along a length of said at least one of said elongate stator portions such that one of said two ends of said movable member keeps facing said winding when said movable member is in or between abutment configurations;
at least one pair of abutment members for respectively contacting one of said two ends when said movable member is in respectively one or the other of said abutment configurations, each of said abutment members being provided with a magnetic portion connected to the stator member into which passes a part of said magnetic flux of said at least one permanent magnet when one of said two ends is abutting against said each of said abutment members,
whereby said movable member is moved into one or the other of said abutment configurations by energizing said at least one winding with a direct current in one sense or in the opposite sense, and remains magnetically locked on any of said abutment members by said magnetic portion in said abutment members.

15. The motor of claim 14 wherein each of said abutment members further includes a non-magnetic abutting portion determining a second airgap between one of said ends which is abutting against one of said abutment members and said magnetic portion in said one of said abutment members.

16. The motor of claim 14, wherein said stator loop member is a ring with an axis and the movable member is a rotor member extending diametrically and rotatable about said axis.

17. The motor of claim 14, wherein said elongate stator portions are rectilinear and parallel and the movable member is movable parallel to said elongate stator portions.

* * * * *